Figure 1:
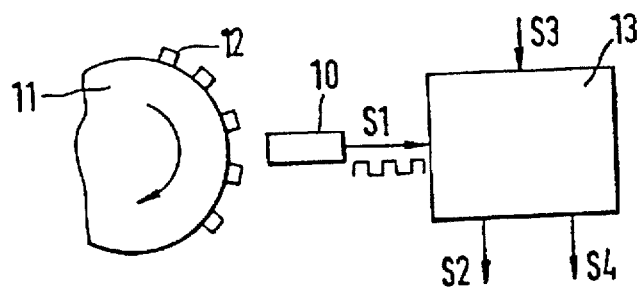

United States Patent [19]

Pfau

[11] Patent Number: 5,729,476
[45] Date of Patent: Mar. 17, 1998

[54] METHOD OF ERROR RECOGNITION FOR ROTARY SPEED SENSORS

[75] Inventor: Martin Pfau, Weissach, Germany

[73] Assignee: Robert Bosch GmbH, Stuttgart, Germany

[21] Appl. No.: 669,292

[22] PCT Filed: Nov. 21, 1995

[86] PCT No.: PCT/DE95/01615

§ 371 Date: Oct. 28, 1996

§ 102(e) Date: Oct. 28, 1996

[87] PCT Pub. No.: WO96/18908

PCT Pub. Date: Jun. 20, 1996

[30] Foreign Application Priority Data

Dec. 14, 1994 [DE] Germany ............... 44 44 408.7

[51] Int. Cl.$^6$ .................................................. B60T 8/32
[52] U.S. Cl. ..................... 364/565; 364/462.021; 303/122.06
[58] Field of Search ........................... 364/565, 569, 364/426.015–426.026; 303/122–122.08, 122.1

[56] References Cited

U.S. PATENT DOCUMENTS

| | | | |
|---|---|---|---|
| 5,099,443 | 3/1992 | Higashimata | 364/565 |
| 5,479,556 | 12/1995 | Oh | 388/805 |
| 5,556,174 | 9/1996 | Wiss et al. | 303/191 |
| 5,583,772 | 12/1996 | Pfau | 364/426.023 |

FOREIGN PATENT DOCUMENTS

| | | |
|---|---|---|
| 0193335 | 1/1991 | European Pat. Off. |
| 4405 801.2 | 2/1994 | Germany. |

*Primary Examiner*—James Trammell
*Attorney, Agent, or Firm*—Michael J. Striker

[57] ABSTRACT

Methods for recognizing a malfunction of a rotary speed sensor, for instance a wheel-speed sensor in an ABS system, are proposed; on the basis of the signals of the rotary speed sensor, wheel speeds are ascertained, and from them, filtered wheel speeds and filtered wheel speed changes are ascertained. By comparing filtered and unfiltered variables and by plausibility investigations, sensor errors and in particular absence of the sensor signal are detected.

8 Claims, 1 Drawing Sheet

METHOD OF ERROR RECOGNITION FOR ROTARY SPEED SENSORS

PRIOR ART

It is known that rotary speed sensors, especially wheel-speed sensors, which furnish information for safety-relevant systems such as ABS, must be monitored for malfunction. Malfunctions can occur if interference signals are input, or if line interruptions or the like occur.

Since the rotary speed is typically ascertained from the time between signal edges furnished by the sensor, an absent rotary speed sensor signal, in speed calculation for the time interval between two signal edges, would lead to an overly low rotary speed or wheel speed. In ABS systems, an improper pressure reduction at the affected wheel would then occur, leading to uncertainties.

For this reason, German Patent Application DE P 44 05 801.2 for instance proposes monitoring the output signal of the wheel-speed sensor, in an anti-lock brake system, to check on the one hand whether a plausible time has elapsed between individual pulses of the sensor signal. It is also monitored whether physically impossible variation values occur as the wheel runs up to speed. Dependent on this, two different comparison thresholds are made operative in alternation, depending on whether the wheel is found to be running up to speed continuously or not.

Other known versions for fast detection of absent sensor signals are based substantially on calculating an implausibly high wheel delay. An unfiltered wheel speed is then calculated from the time between the last two arriving edges of the sensor signal. If no edge appears for a certain period of time, then an edge that would arrive at that time in the most favorable case can be set theoretically. From a thus-constructed time interval, a new wheel speed can then be calculated. From the difference from the last wheel speed calculated before that, a certain wheel delay is then obtained.

Conversely, for every speed at a predetermined allowable wheel delay, a time interval can be determined within which the next edge must arrive. These methods of dynamic sensor monitoring involve more or less simplified interrogation, or interrogation adapted to the corresponding speed calculation, of a maximum allowable time period between two successive edges. One such method is also described in European Patent Disclosure EP 0 193 335 D1.

In the conventional methods, very pronounced wheel delays or corresponding times must be interrogated in order to prevent incorrect response. If the requisite monitoring thresholds are too high or monitoring times are too long, however, a sporadically occurring sensor interruption can no longer be detected. This is a disadvantage of the known methods, especially since in practice major wheel delays occur if braking is done from a high speed on a surface with a high coefficient of friction and if at the established input brake pressure there is an abrupt change to a very low coefficient of friction, such as if the wheel lifts away from the road surface.

ADVANTAGES OF THE INVENTION

The method of the invention having the characteristics of the main claim has the advantage over the prior art that it is secure against incorrect response of the error recognition in the event of simultaneously low monitoring thresholds or short monitoring times with which an actual sensor failure is intended to be detected. This is possible since a wheel relief or a transition to a low coefficient of friction never occurs suddenly.

It is accordingly especially advantageously possible to detect whether absent sensor signals are the consequence of a physical wheel delay or of an interruption in the sensor signal.

The advantages are attained in that dynamic sensor monitoring is done in which filtered and unfiltered variables are monitored for plausibility. Advantageously, these variables are the unfiltered wheel speed, the filtered wheel speed, and the filtered change (derivation) in the wheel speed or in other words the filtered acceleration.

Further advantages of the invention are attained with the aid of the provisions recited in the dependent claims.

DRAWING

One exemplary embodiment of the invention is shown in the drawing and will be described in further detail in the ensuing description. Specifically, FIG. 1 shows a block circuit diagram of an arrangement in which the method of the invention is performed, and FIG. 2 is a flowchart for an exemplary embodiment of a method for error recognition for rotary speed sensors.

DESCRIPTION

Figure 2:
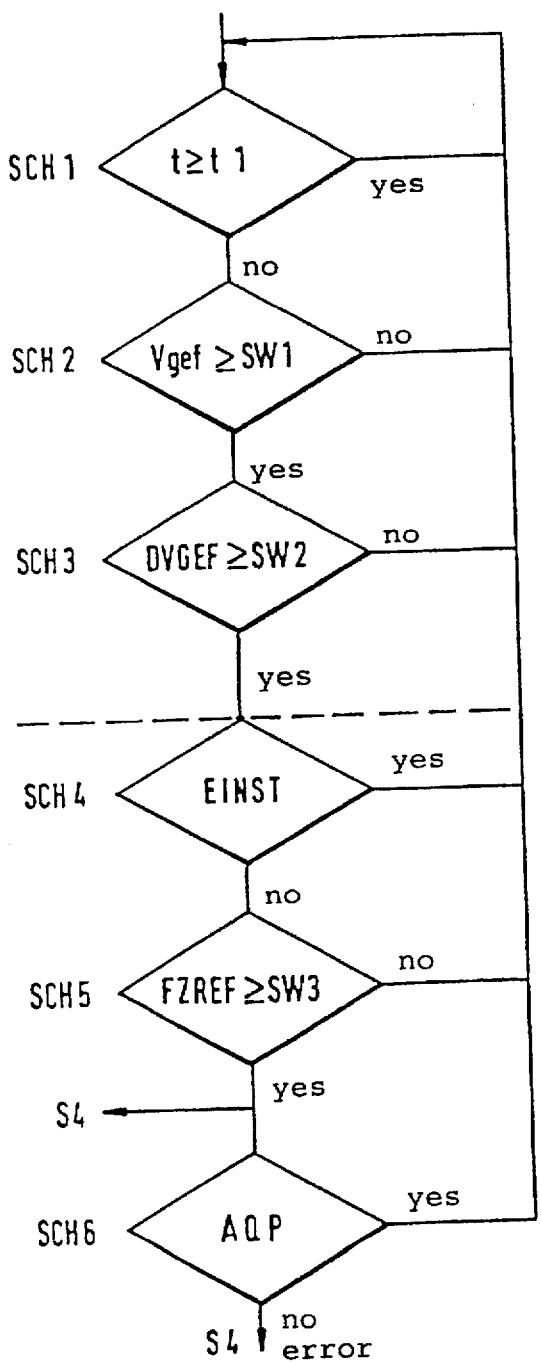

In FIG. 1, an arrangement is schematically shown with which the output signal (sensor signal) S1 of a rotary speed sensor 10 is to be evaluated. By way of example, this rotary speed sensor 10 detects the rotary speed of a wheel, by scanning a disk 11 having a number of teeth 12, that revolves at the speed of the wheel.

In the evaluation device 13 in which the methods of the invention are performed, the sensor signal S1 is evaluated. Rotary speed values are calculated in the usual way from the time interval between the edges of the sensor signal S1. Based on these rotary speed values, trigger signals S2, for instance for an ABS system, are formed in the evaluation device 13; further signals, designated S3, can also be used in the evaluation device.

The evaluations are repeated in the evaluation device 13 at a cycle interval of t1=10 ms, where the time t1 is given as an example.

If the wheel speed in a motor vehicle is to be measured with the arrangement shown in FIG. 1, then it can be assumed that the wheel circumference is approximately 2 m. If one assumes that the number of teeth on the disk 11 is 48, for example, then for a vehicle speed of more than 7.5 km/h, at least one pulse must appear within the cycle time of 10 ms. Based on this recognition, the methods of the invention begin to recognize a sensor error from the absence of a sensor signal.

FIG. 2 shows a block circuit diagram for such a method that is performed in the evaluation device 13.

Based on the sensor signal S1, which can be considered a rectangular signal and which mirrors the surface of the disk 11, in the first step SCH1, a check is made in the evaluation device 13 as to whether a signal edge appears within the cycle time t1. If so, the evaluation program begins step SCH1 over again. Conversely, if it is found that no signal edge has occurred within the cycle time in the past 10 ms cycle (n−1), then in step SCH2 it is checked whether in the current cycle n the filtered wheel speed Vgef at the applicable wheel is greater than a first threshold value SW1, which for instance is 40 km/h.

The filtered wheel speed Vgef is calculated independently of the method for error recognition in the evaluation device 13 from the unfiltered wheel speed Vung. The unfiltered wheel speed Vung is calculated in the usual way from the time interval between edges of the sensor signal S1.

The speed of 40 km/h as a threshold value SW1 is an empirical value and requires a monitoring of 10 ms, which is precisely the cycle time.

If it is found in step SCH2 that the filtered wheel speed is less than 40 km/h, then the program begins over again with step SCH1. Conversely, if it is found that the filtered wheel speed Vgef is greater than or equal to 40 km/h, then in step SCH3 it is checked whether the filtered and derived speed change DVGEF in the applicable cycle at the affected wheel is greater than a further threshold value SW2, such as −10 km/h.

The filtered, derived speed DVGEF(n) is formed from the difference between the two filtered wheel speeds:

$$\text{Vgef 10 ms (n)} - \text{Vgef 10 ms (n−1)}.$$

If it is found in step SCH3 that the filtered wheel speed change exceeds the threshold value SW2, then in step SCH4 it is checked whether for the affected wheel an error recognition is set, because of a finding of the input of an interference signal. If no error recognition is set, then it is checked in step SCH5 whether the vehicle reference speed FZREF is greater than a threshold value SW3, which by way of example is also 40 km/h.

If this condition, too, is met then either an error recognition S4 is already tripped, or in an additional step SCH6 it is checked whether aquaplaning is detected at the affected wheel. If not, then in that case the error recognition S4 is tripped.

If the finding in each case is no in steps SCH4, 5 and 6, then the program returns to the start.

The information required in steps SCH4, 5 and 6 is obtained in the evaluation device 13 independently of the error recognition method. For instance, with the aid of a separate error recognition it is detected whether incorrect inputs are involved. Moreover, from the ascertained wheel speeds, a vehicle reference speed FZREF is formed in the usual way, for instance on the basis of the speed of the second-fastest wheel. Whether or not aquaplaning is occurring can likewise be detected by means of separate conditions.

With the methods described, a suddenly absent sensor signal can accordingly be recognized as a sensor error. The requirement for doing so is that for at least 10 ms, no edge of the sensor signal S1 has arrived. This condition is met each cycle at every speed at less than 7.5 km/h. By means of additional conditions regarding the previous history, it is therefore assured that the wheel speed has not suddenly dropped, because that is not plausible as a consequence of physically possible wheel delay. The proposed comparison of filtered variables, that is, the detection of the wheel delay, and unfiltered variables, that is, a sudden change in speed, achieves the additionally desired protection. If the DVGEF value of the filtered speed is small in amount, then it can be assumed that a steep wheel run-in has not occurred for several 10 ms cycles. If there is no pronounced wheel delay, however, then the unfiltered speed can differ sharply downward from the filtered speed only in the event of interference or an interrupted signal.

I claim:

1. A method for error recognition in rotary speed sensors which output an output signal that comprises a train of pulses, in which it is first checked whether in a preceding time interval no pulse edge has arrived, characterized in that further comparisons are done in which filtered variables and unfiltered variables are evaluated jointly, and if at least one of the conditions is met an error signal is output.

2. The method for error recognition in rotary speed sensors of claim 1, characterized in that the filtered and unfiltered variables are formed as a function of the current time interval or of the preceding time intervals.

3. A method for error recognition in rotary speed sensors that output a pulselike output signal, in which a rotary speed is ascertained from the chronological spacing of the pulse edges and an error recognition is effected in that a check is made as to whether in a first time interval in the past no signal edge has arrived; wherein it is further checked whether the filtered wheel speed formed from the wheel speed exceeds a first threshold value, characterized in that it is further checked whether the difference between the filtered speed, formed in the preceding cycle interval, and the likewise-filtered speed ascertained in the current cycle exceeds a second threshold value, and if the three conditions are met an error recognition is output.

4. The method for error recognition in rotary speed sensors of claim 3, characterized in that the threshold values (SW1, SW2) are formed as plausible variables in conjunction with events in an anti-lock braking control operation in motor vehicles.

5. The method of claim 3, characterized in that additional error recognitions are performed that allow detection of electromagnetic interference with the sensor signal, and an error recognition is performed only whenever no interference has been detected.

6. The method of claim 3, characterized in that the error recognition is performed only whenever it is detected that the vehicle reference speed is above a third threshold value.

7. The method of claim 3, characterized in that in addition monitoring takes place that allows detection of the occurrence of aquaplaning, and an error recognition is performed whenever no aquaplaning is detected.

8. The method of claim 3, characterized in that a monitoring time (t1) is defined, and this monitoring time (t1) is varied at predeterminable speeds.

* * * * *